United States Patent [19]

Hayashi et al.

[11] 4,416,461
[45] Nov. 22, 1983

[54] FUEL STORAGE VESSEL SUPPORTING STRUCTURE

[75] Inventors: Toshio Hayashi; Isao Hayashi, both of Yokohama, Japan

[73] Assignee: Nissan Motor Company, Limited, Yokohama, Japan

[21] Appl. No.: 343,928

[22] Filed: Jan. 29, 1982

[30] Foreign Application Priority Data

Feb. 10, 1981 [JP] Japan ............................. 56-19269

[51] Int. Cl.³ ............................................. B60K 15/08
[52] U.S. Cl. ................................... 280/5 A; 280/783; 280/784
[58] Field of Search .............. 280/5 A, 5 R, 783, 784

[56] References Cited

U.S. PATENT DOCUMENTS 4,093,254 6/1978 Ezaki .................................. 280/5 A

FOREIGN PATENT DOCUMENTS 2621922 1/1977 Fed. Rep. of Germany .

Primary Examiner—Joseph F. Peters, Jr
Assistant Examiner—Donn McGiehan
Attorney, Agent, or Firm—Lane, Aitken & Kananen

[57] ABSTRACT

A fuel storage vessel supporting structure comprising a front bracket member rigidly interconnecting the vehicle body structure and the front end portion of the fuel storage vessel, and a rear bracket member interconnecting the vehicle body structure and the rear end portion of the fuel storage vessel and partially deformable.

2 Claims, 6 Drawing Figures

FUEL STORAGE VESSEL SUPPORTING STRUCTURE

FIELD OF THE INVENTION

The present invention relates to a fuel storage vessel supporting structure for supporting a fuel storage vessel of an automotive vehicle.

SUMMARY OF THE INVENTION

In accordance with the present invention, there is provided a fuel storage vessel supporting structure for supporting a fuel storage vessel of an automotive vehicle having a fore-and-aft direction, the fuel storage vessel having front and rear end portions and the vehicle having a vehicle body structure, comprising: a front bracket member rigidly interconnecting the vehicle body structure and the front end portion of the fuel storage vessel, and a rear bracket member interconnecting the vehicle body structure and the rear end portion of the fuel storage vessel and partially deformable to permit the fuel storage vessel to be retained stationary when the rear end portion of the vehicle body structure is caused to deform toward the front end of the vehicle body structure by an impact force applied to the rear end of the vehicle body structure.

BRIEF DESCRIPTION OF THE DRAWINGS

The drawbacks of the prior-art fuel storage vessel supporting structure and the features and advantages of a fuel storage vessel supporting structure according to the present invention will be more clearly understood from the following description taken in conjunction with the following drawings in which like reference numerals designate similar or corresponding members, elements or portions and in which.

DESCRIPTION OF THE PRIOR ART

Figure 1:
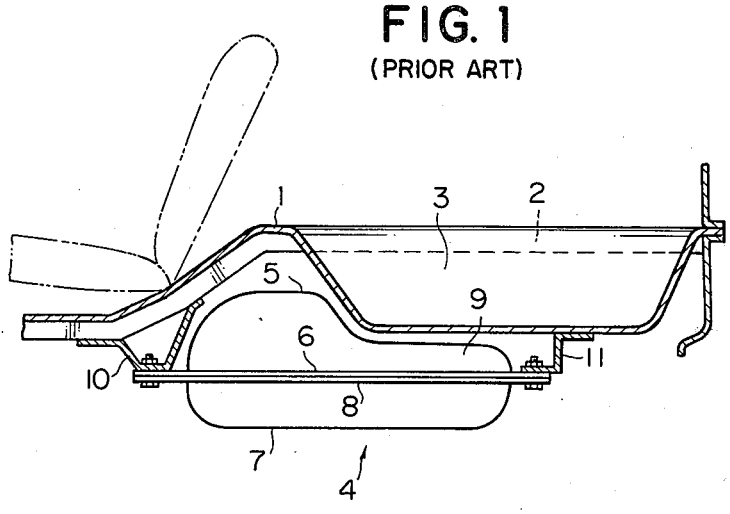
FIG. 1 is a fragmentary side view, partly in cross section, of a prior-art fuel storage vessel supporting structure.
Figure 2:
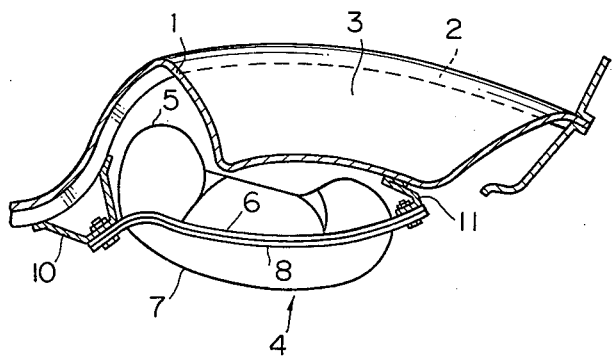
FIG. 2 is a fragmentary side view similar to FIG. 1 but showing the prior-art fuel storage vessel supporting structure deformed toward the front end of the vehicle body structure by an impact force applied to the rear end of the vehicle body structure.

A typical example of a prior-art fuel storage vessel supporting structure is shown in FIGS. 1 and 2 of the drawings. A floor panel 1 forms part of a vehicle body structure of an automotive vehicle and is shown as reinforced by a pair of floor side members 2 spaced apart in parallel from each other and welded or otherwise securely connected to the lower surface of the floor panel 1. The floor panel 1 has a rear end wall portion downwardly dented to form a tire storage portion 3. A fuel storage vessel 4 comprises an upper half portion 5 formed at its lower end with a flange portion 6 horizontally extending and a lower half portion 7 formed at its upper end with a flange portion 8 also extending horizontally and welded to the flange portion 6 of the upper half portion 5. As best seen from FIG. 1, the upper half portion 5 of the fuel storage vessel 4 has its rear end portion 9 dented and configured conformingly to the tire storage portion 3 of the floor panel 1 for the reason that the rear end portion 9 of the fuel storage vessel 4 is arranged directly below the tire storage portion 3. The fuel storage vessel supporting structure herein shown comprises a front bracket member 10 welded or otherwise securely connected to the floor panel 1 through the floor side members 2 and fastened by means of bolts and nuts to the flange portions 6 and 8 of the fuel storage vessel 4. The fuel storage vessel supporting structure further comprises a rear bracket member 11 having an upper portion welded to the lower surface of the tire storage portion 3 of the floor panel 1 and a lower portion fastened by means of bolts and nuts to the flange portions 6 and 8 of the fuel storage vessel 4.

With such a prior-art fuel vessel supporting structure thus arranged and constructed in the above for supporting the fuel storage vessel 4 below the flow panel 1 adjacent the tire storage portion 3, the fuel storage vessel 4 is, however, deformed as shown in FIG. 2 when the rear portion of the floor panel 1 and the floor side members 2 forming part of the vehicle body structure are caused to deform toward the front end of the vehicle body structure by an impact force applied to the rear end of the vehicle body structure, for example, upon a rear collision with another automotive vehicle or a foreign object. More specifically, if the vehicle body structure receives such a violent large impact force caused by a rear end collision, the rear end portion of the vehicle body structure and the fuel storage vessel 4 are concurrently deformed or crushed by the reason that the fuel storage vessel 4 of a relatively high rigidity is securely connected to the floor panel 1 and that the front bracket member 10 is disposed in the vicinity of the vehicle body structure of a relatively high rigidity and thus receives a relatively small impact force. Especially in the case of fatal or critical accidents, problems are encountered in that the fuel storage vessel 4 is liable to be broken and cause fuel to leak out, thereby resulting in a dreadful second vehicular disaster.

The present invention contemplates provision of useful solutions to these problems which have been inherent in the prior-art fuel storage vessel supporting structure of the described natures.

DESCRIPTION OF THE PREFERRED EMBODIMENT

Figure 3:
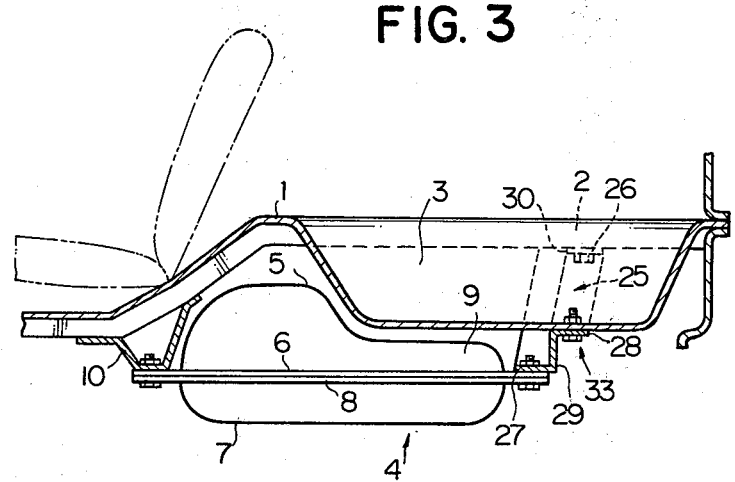
FIG. 3 is a fragmentary side view, partly in cross section, of an embodiment of a fuel storage vessel supporting structure according to the present invention.
Figure 4:
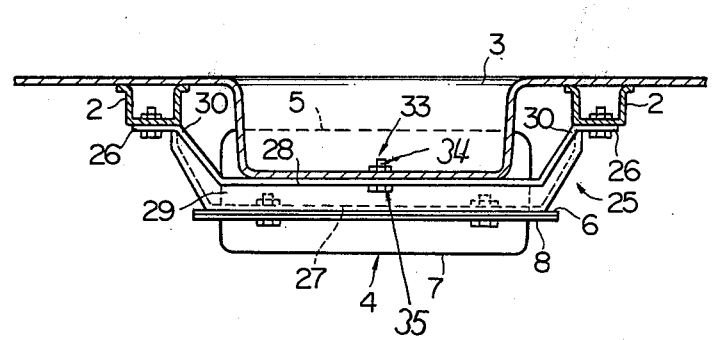
FIG. 4 is a fragmentary end view, partly in cross section, of the fuel storage vessel supporting structure according to the present invention.
Figure 5:
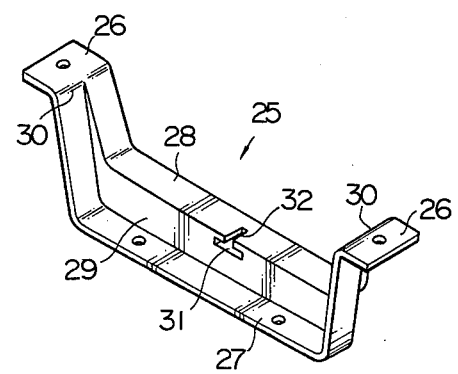
FIG. 5 is a perspective view of a rear bracket member forming part of the fuel storage vessel supporting structure according to the present invention.

FIGS. 3, 4 and 5 of the drawings show a preferred embodiment of the fuel storage vessel supporting structure according to the present invention aiming at provision of such solutions.

Referring first to FIGS. 3, 4 and 5, the fuel storage vessel supporting structure embodying the present invention is shown comprising a front bracket member 10 welded or otherwise securely connected to the floor panel 1 through the floor side members 2 and fastened by fastening means such as bolts and nuts to the flange portions 6 and 8 of the fuel storage vessel 4. The fuel storage vessel supporting structure further comprises a rear bracket member 25 which has a generally U-shaped configuration to allow the tire storage portion 3 of the floor panel 1 to be received therein. Thus, the rear bracket member 25 comprises a pair of fixed end portions 26 bent horizontally and securely fastened by fastening means such as bolts and nuts to the floor side members 2, forming part of the vehice body structure, a front weir-shaped portion 27 downwardly depending from the fixed end portions 26 and securely fastened by fastening means such as bolts and nuts to the flange portions 6 and 8 of the fuel storage vessel 4, a rear weir-shaped portion 28 extending rearwardly of the front weir-shaped portion 27 and downwardly depending from the fixed end portions 26, the rear weir-shaped portion 28 being shallower in depth than the front weir-shaped portion 27 and gradually merging at the fixed end portions 26, and an intermediate portion 29 connecting together the front and rear weir-shaped portions 27 and 28. The intermediate portion 29 is convergingly tapered toward and terminates at the fixed end portions 26 for forming a pair of stress raising portions 30 which are ready to be deformable when the rear end portion of the floor panel 1 is caused to deform toward the front end of the vehicle body structure by an impact force applied to the rear end of the vehicle body structure. The rear bracket member 25 further comprises a first or lateral slot 31 formed in the upper portion of the intermediate portion 29 and laterally extending, and a second or longitudinal slot 32 formed in the rear weir-shaped portion 28 and open at the first slot 31, the first and second slots 31 and 32 being substantially a perpendicular relationship to each other.

A fastening member 33 has a threaded stem portion 34 and a head portion 35 integral with the stem portion 34. The stem portion 34 is adapted to be passed through the second slot 32 for interconnecting the fuel storage vessel 4 and the tire storage portion 3 of the floor panel 1. The heat portion 35 is sized so as to be escapable from the first slot 31 when the rear portion of the vehicle body structure is caused to deform toward the front end of the vehicle body structure by an impact force applied to the rear end of the vehicle body structure. The fastening member 33 constitutes fastening means for fastening said rear weir-shaped portion 28 and the floor panel 1 and forwardly escapable together with the floor panel 1 when the rear end portion of the floor panel 1 is caused to deform toward the front end of the vehicle body structure by an impact force applied to the rear end of the vehicle body structure.

Description of the fuel storage vessel supporting structure according to the present invention thus constructed in the above will be made hereinlater with reference to FIG. 6.

Figure 6:
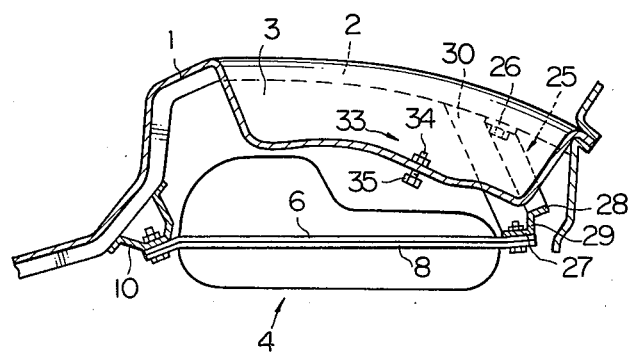
FIG. 6 is a fragmentary side view similar to FIG. 4 but showing the storage vessel supporting structure deformed toward the front end of the vehicle body structure by an impact force applied to the rear end of the vehicle body structure.

When the rear end portion of the vehicle body structure is caused to deform toward the front end of the vehicle body structure by an impact force applied to the rear end of the floor panel 1 forming part of the vehicle body structure, the floor panel around the tire storage portion 3 is deformed as shown in FIG. 6. This results in the fact that the head portion 35 of the fastening member 33 is escaped from the first and second slots 31 and 32 and the fastening member 33 is thus moved toward the front end of the vehicle body structure together with the floor panel 1 since the second slot 32 is open at the first slot 31 and the rear bracket member 25 is deformed at the stress raising portions 30. When the longitudinal end and upper portions of the rear bracket member 25 are moved toward the front end of the vehicle body structure together with the floor side member 2, the lower portions of the front and rear weir-shaped portions 27 and 28 and the intermediate portion 29 are held stationary by the reason that the front weir-shaped portion 27 is fastened to the flange portions 6 and 8 of the fuel storage vessel 4 and that the stress raising portions 30 are deformed. This means that the whole profile of the fuel storage vessel 4 is maintained in its original contour. Even if a relatively large impact force is applied tothe rear end of the vehicle body, the deformation of the fuel storage vessel 4 may be reduced to its minimum level. Therefore, the fuel storage vessel 4 is not liable to be broken and does not cause fuel to leak out especialy in the case of fatal or critical accidents, thereby preventing a dreadful second vehicular disaster.

While it has been described that the connection between the flange portions 6 and 8 of the fuel storage vessel 4 and the rear weir-shaped portion of the rear bracket member 25 are provided by only one set of the fastening member 33, the first slot 31 and the second slot 32, the number of fastening member, first slot and second slot may be increased if necessary according to the present invention.

What is claimed is:

1. A fuel storage vessel supporting structure for supporting a fuel storage vessel of an automotive vehicle having a fore-and-aft direction, the fuel storage vessel having front and rear end portions and the vehicle having a vehicle body structure, comprising:

a front bracket member rigidly interconnecting the vehicle body structure and the front end portion of said fuel storage vessel, and a rear bracket member comprising a pair of fixed end portions bent horizontally and fastened to the vehicle body structure, a front weir-shaped portion downwardly depending from the fixed end portions and fastened to the rear end portion of said fuel storage vessel, a rear weir-shaped portion extending rearwardly of the front weir-shaped portion and downwardly depending from the fixed end portions, the rear weir-saped portion being shallower in depth than the front weir-shaped portion and gradually merging at the fixed end portions, an intermediate portion connecting together the front end rear weir-shaped portions and convergingly tapered toward and terminating at the fixed end portions for forming a pair of stress raising portions which are ready to be deformable, and fastening means for fastening said rear weir-shaped portion and said vehicle body structure and forwardly escapable together with said vehicle body structure from said rear weir-shaped portion and interconnecting the vehicle body structure and the rear end portion of said fuel storage vessel and partially deformable to permit the fuel storage vessel to be retained stationary.

2. A fuel storage vessel supporting structure as set in forth in claim 1, wherein said rear bracket member further comprises a laterally-extending first slot formed in the upper portion of said intermediate portion and a second slot formed in said rear weir-shaped portion and open at the first slot, the first and second slots being substantially in perpendicular relationship to each other, and in which said fastening means comprises at least one fastening member having a threaded stem portion and a head portion integral with the stem portion, the stem portion being passed through said second slot for interconnecting said fuel storage vessel and said body structure, the head portion being escapable from said first slot.

* * * * *